(12) United States Patent
Sikorski et al.

(10) Patent No.: US 7,101,278 B2
(45) Date of Patent: Sep. 5, 2006

(54) HVAC UNIT HOUSING ASSEMBLY

(75) Inventors: Richard Sikorski, Macomb, MI (US); Eugene Kozak, Royal Oak, MI (US)

(73) Assignee: Valeo Climate Control Corp, Auburn Hills, MI (US)

( * ) Notice: Subject to any disclaimer, the term of this patent is extended or adjusted under 35 U.S.C. 154(b) by 168 days.

(21) Appl. No.: 10/828,086

(22) Filed: Apr. 20, 2004

(65) Prior Publication Data

US 2005/0230079 A1    Oct. 20, 2005

(51) Int. Cl.
*F24F 13/20*    (2006.01)

(52) U.S. Cl. .................. 454/300; 454/301; 454/69; 220/4.21

(58) Field of Classification Search .................. 454/69, 454/49, 184, 300, 301, 104, 109, 245, 265; 206/470, 576; 220/4.21, 693
See application file for complete search history.

(56) References Cited

U.S. PATENT DOCUMENTS

| | | | |
|---|---|---|---|
| 5,228,475 A | | 7/1993 | Trill |
| 5,391,112 A | * | 2/1995 | Wardlaw ...................... 454/139 |
| 5,800,259 A | * | 9/1998 | Olney ......................... 454/109 |
| 6,045,444 A | * | 4/2000 | Zima et al. .................. 454/121 |
| 6,549,406 B1 | * | 4/2003 | Olesiewicz et al. .......... 361/695 |
| 6,568,551 B1 | * | 5/2003 | Grossenbacher ........... 220/4.02 |
| 6,634,938 B1 | | 10/2003 | Vincent |
| 6,883,861 B1 | * | 4/2005 | Laborie et al. .............. 296/208 |
| 6,932,691 B1 | * | 8/2005 | Lin ............................. 454/69 |
| 2003/0145978 A1 | | 8/2003 | Tsurushima et al. |

* cited by examiner

*Primary Examiner*—Gregory Wilson
(74) *Attorney, Agent, or Firm*—Ronald Courtney

(57) ABSTRACT

The present invention provides a vehicle ventilation system, and, in particular, a heating and air-conditioning assembly and method of making such an assembly, wherein the assembly comprises a multi-portion HVAC housing and an alignment feature.

The alignment feature preferably follows the contours of the housing portions of the HVAC. Preferably, the alignment feature is a baffle, or, in particular, a cross flow baffle, that serves an air directing as well as bridge function between housing portions of the HVAC, reducing packaging space for the HVAC unit while providing ease of assembly and reduced tool complexity for multi-piece HVAC housings.

7 Claims, 5 Drawing Sheets

HVAC UNIT HOUSING ASSEMBLY

FIELD OF THE INVENTION

The present invention relates to vehicle ventilating heating and/or air-conditioning systems, and, in particular, systems comprising HVAC units having multi-part housings. The present invention particularly applies to air conditioning systems where molded housings contain devices for heating and/or cooling air and directing air within a minimal volume of space.

BACKGROUND OF THE INVENTION

In automotive ventilating systems, and in ventilating systems generally, there exists a need to direct air within and through an HVAC unit to provide appropriate heating and cooling temperatures as finally desired, through respective air pathways. Air can be directed by dampers, doors, and various mechanisms to wherever the ventilating system designer would like the air to proceed, and under any selected design condition. For example, in a vehicle it is desirable to provide for components, and, in particular, plastic or plastic like components, to be located within the HVAC housing, and, in particular, between and within the housing portions of the HVAC unit. In the majority of automotive HVAC units, the HVAC unit comprises two distinct major portions or housing 'halves' which need to be attached or 'fastened' together in some fashion to provide for a complete HVAC unit housing.

The HVAC design or architecture is limited by a number of requirements. For example, components such as described above must be provided with an air sealing around the components that relate to forces or pressure points that are found distributed along contact points or 'patches' where two housing portions contact each other. Typically, sealing features such as tongue and groove air sealing features, are found at the area of the contact patch as the seal that is found between the housing requires a force normal to it to ensure that the housing are sealed properly.

In addition to contact patches where two housing portions contact each other, traditional HVAC unit architectures often have contact points at or near the center of the housing of a smaller surface area than those found at other areas of the housing portions such as the outer walls. Such smaller contact areas are typically found at an end of the heater core, for example, and are necessary to provide normal seal forces in these areas. In order to ensure that the seal forces in these areas are normal and adequate, HVAC housing are typically designed with a prescribed region or 'tower' located or incorporated into the plastic component that is large enough to allow a screw to be inserted from outside the housing portions through the housing portions to fasten the housing portions together, thereby providing for normal seal forces in the contact areas.

The tower concept, while producing the desired effect of allowing the forces to be normal along the contact areas, has a number of disadvantages. Current state of the art provides for a tower with a screw boss and/or locator pin to force the two walls together. The screw, therefore, typically enters into a 'well' or 'fosse' in the housing for assembly. The tower requires screw driver tool access from the external side of the housing and therefore requires more packaging space and a thin tower in the plastic mold. See FIG. 1.

The mold tool for the plastic component that forms the tower, for example, is required to be designed to provide for an often tall and thin mold to produce the tower feature. The resultant tool also has the disadvantage of being costly to produce and of having limited life due to the extraordinary features related to the tower.

The prior art has many complex devices for fastening portions of housings in automobile mounted HVAC systems. However, the complexity only adds cost to the design process, adds cost to the manufacture, and further increases, rather than decreases, overall space requirements of the HVAC unit.

The present invention, by providing for an alternative attachment or fastening means without the need for such as tower, overcomes the problems found in the prior art.

SUMMARY OF THE INVENTION

The present invention provides a vehicle ventilating system, and, in particular, a system having a heating and air-conditioning assembly such as an HVAC unit, wherein the HVAC unit comprises a multi-portion HVAC housing and an alignment feature.

The present invention therefore relates to the field of ventilating systems such as vehicle air-conditioning and heating systems, having HVAC units comprised of multi portion housings. More specifically, the present invention relates to an at least two portion HVAC housing employing an alignment feature and fastening means so that the alignment feature is attached or fastened to the housing portions of the HVAC unit. In preferred embodiments, the alignment feature is fastened to each housing portion by a fastening means. The alignment feature may preferably be of any form; more preferably the alignment feature is of a plastic or plastic like material or of a material molded such as that used to form one of the elements of the HVAC unit. More preferably the material is made of the same or similar material as the HVAC unit housing or one of the air directions structure or baffles that is found within the HVAC unit. The alignment feature is preferably U shaped or forms a contour that matches the contour of the HVAC housing portions in contact with or near the alignment feature that are fastened together by the alignment feature. Most preferably the alignment feature is a baffle that has an air directing function as well as an attachment or fastening function. Most preferably the alignment feature is a cross flow baffle.

Optionally, a connecting piece may be provided to help retain contact between housing portions or halves.

The present invention also provides for a method of fastening portions of an at least two portion HVAC housing by assembling of an HVAC unit housing, employing an alignment feature and fastening the at least two portion HVAC housing by a fastening means so that the alignment means is attached or fastened to the housing portions, and, particularly, to the internal walls of the HVAC unit. A preferred method for making an HVAC unit assembly in accordance with the present invention comprises the steps of providing an alignment feature, fastening to at least two points the alignment feature to at least two portions of an at least two portion HVAC housing unit via a fastening means, thereby forming an appropriate air sealing around HVAC internal components. Particularly preferred are methods wherein the alignment feature is a cross flow baffle, and wherein the cross flow baffle is mounted via the one first fastening means to one portion and by a second fastening means to another portion of the HVAC housing unit internal walls.

In view of the drawbacks and disadvantages identified in the prior art, it is an object of this invention to provide a simpler and more reliable HVAC housing with an alignment feature and fastening means. It is a further object of the present invention to provide for an alignment feature and fastening means that not only provides a fastening function, but also contributes to the important function of directing air selectively in air pathways of a ventilating system. The present invention provides for an HVAC unit housing made of at least two parts, Housing left 2a, Housing right 2b. The present invention, in its preferred embodiments, also provides for a Cross flow baffle 10.

The present invention also preferably provides for a tool for making housing halves without a tower forming section. In preferred embodiments of the present invention plastic housing halves are formed with a design form following the tool contour.

Preferably, the fastening means is attached directly to the housing half at one end of the alignment feature. Preferably each fastening means is attached directly to a housing half and to one of the ends of the alignment feature. More preferably, at least one fastening means is attached to at least one housing portion and to one end of the alignment feature and at least one fastening means is attached to at least one other housing portion and to the other end of the alignment feature to form a housing assembly.

The present invention further provides a vehicle air-conditioning module or unit wherein a baffle, and, more preferably, a cross flow baffle, is mounted or 'fastened' to the HVAC housing. The baffle serves as an air directing element as well as a bridge between housing portions of the HVAC, as well as reducing packaging space for the HVAC unit while providing ease of assembly and reduced tool complexity for the overall HVAC housing. More preferred embodiments of the present invention expand the function of the baffle to reduce packaging space of the HVAC unit, improve ease of assembly of the HVAC housings, and reduce tool complexity for HVAC housings.

DETAILED DESCRIPTION OF THE PREFERRED EMBODIMENT

The present invention provides for, in preferred embodiments, an HVAC unit housing assembly for automotive applications comprising a first housing portion having at least one fastening point; a second housing portion having at least one fastening point; an alignment feature having at least two fastening points; and a fastening means wherein the alignment feature is fastened at at least one fastening point by a fastening means to the at least one fastening point of the first housing portion and is fastened at at least one second fastening point by a fastening means to the at least one fastening point of the second housing portion. Once fastened the housing portions form an appropriate air sealing around HVAC internal components. Preferably, the fastening means allow movement of the alignment feature around the point of fastening. More preferably the alignment feature is made of a light weight metallic or plastic or plastic like material, even more preferably, the alignment feature is made of plastic or plastic like material. Also, more preferably, the alignment feature is an air directing structure, even more preferably, the alignment feature is a cross flow baffle. In preferred embodiments, the alignment feature fastening point is U shaped or forms a contour that matches or closely follows the contour of the HVAC housing portions in contact with or near the alignment feature. In embodiments where the alignment feature is an air directing structure or baffle, preferably the baffle is mounted to the HVAC housing via the fastening means and serves as a bridge between housing portions of the HVAC.

Figure 1:
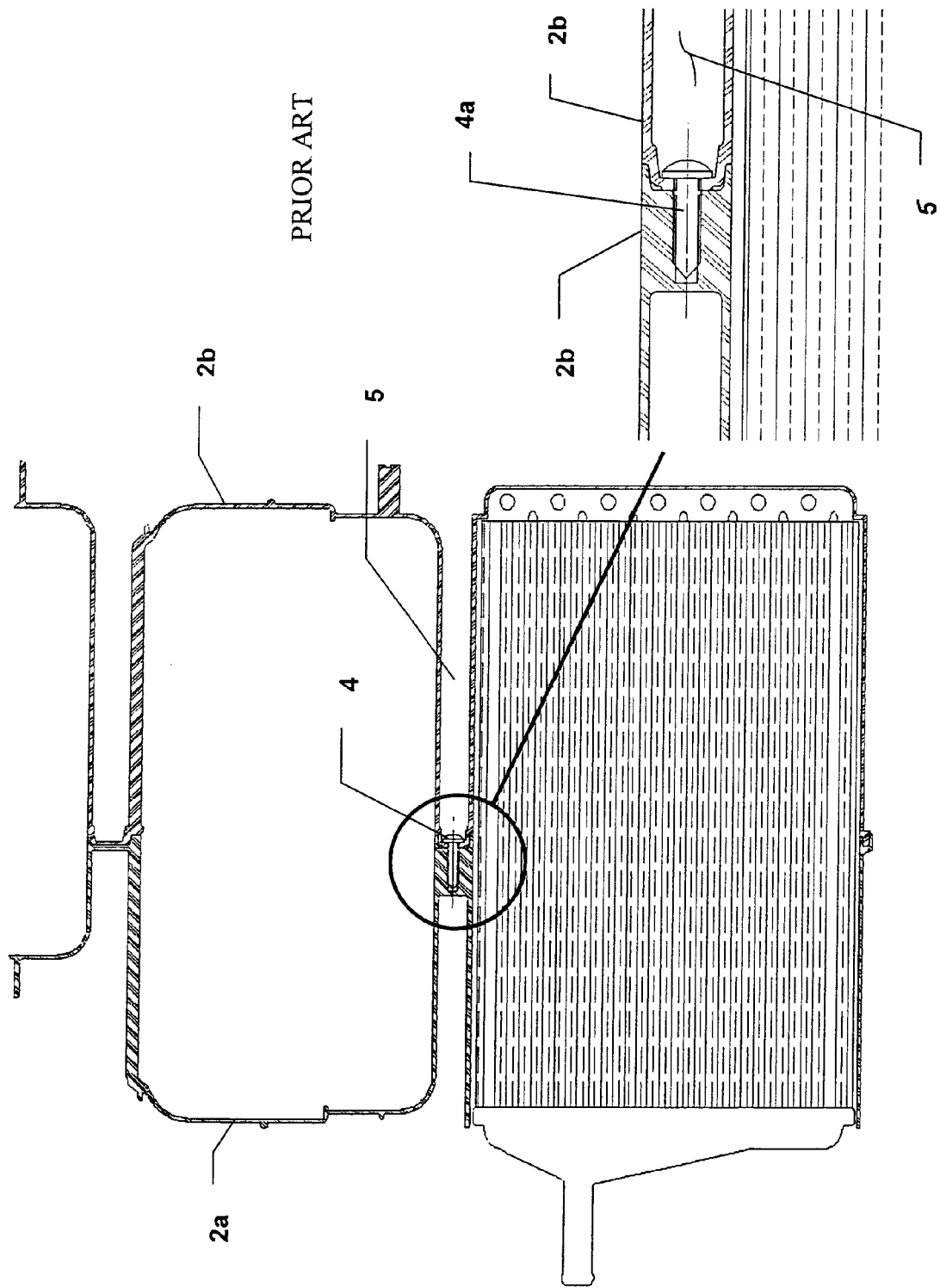
FIG. 1 shows a cross section of a prior art HVAC unit with housing attached or fastened using conventional tower and screw architecture.
Figure 2:
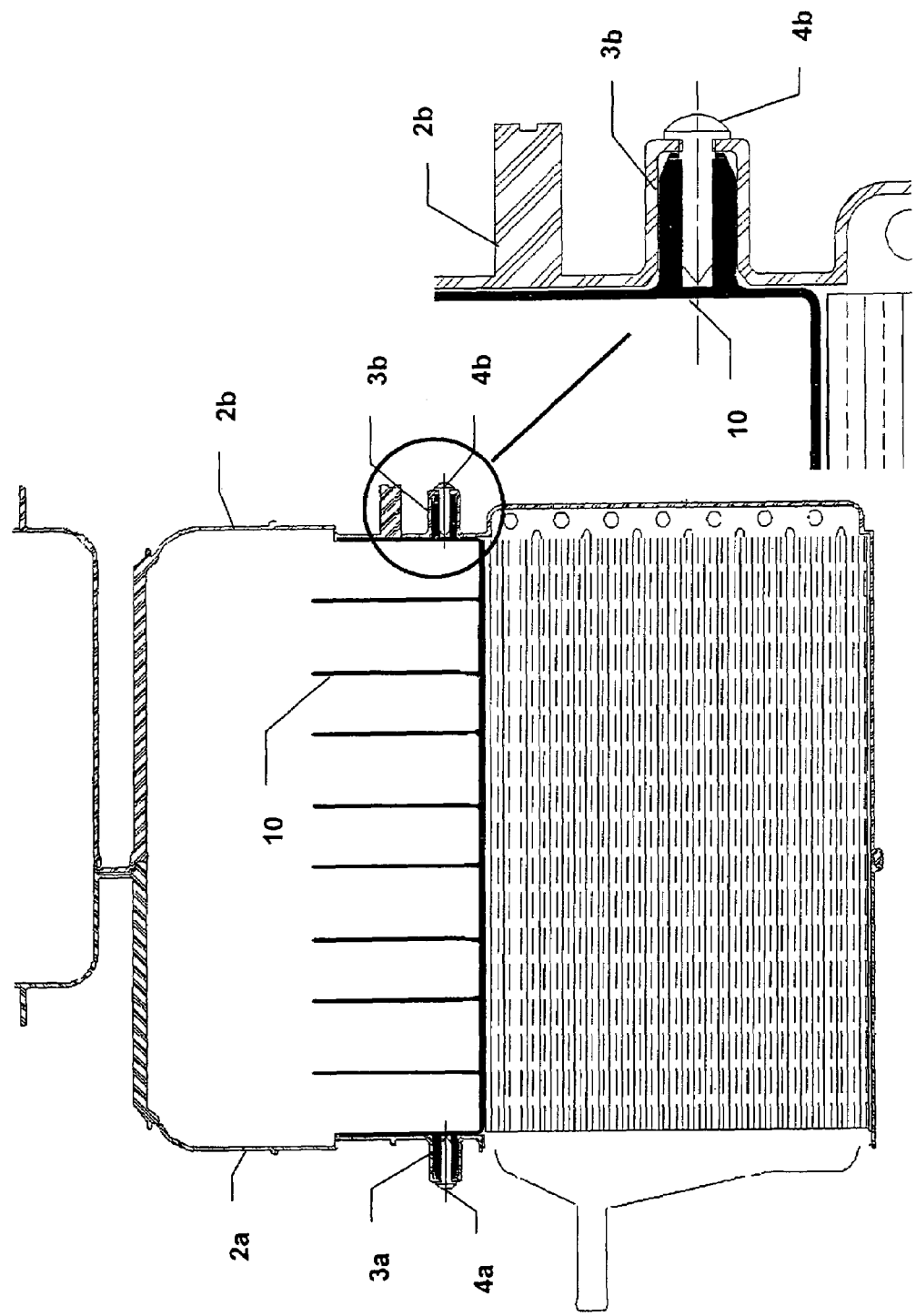
FIG. 2 shows a cross section of an HVAC unit having an alignment feature and fastening means in accordance with an aspect of the present invention.
Figure 3:
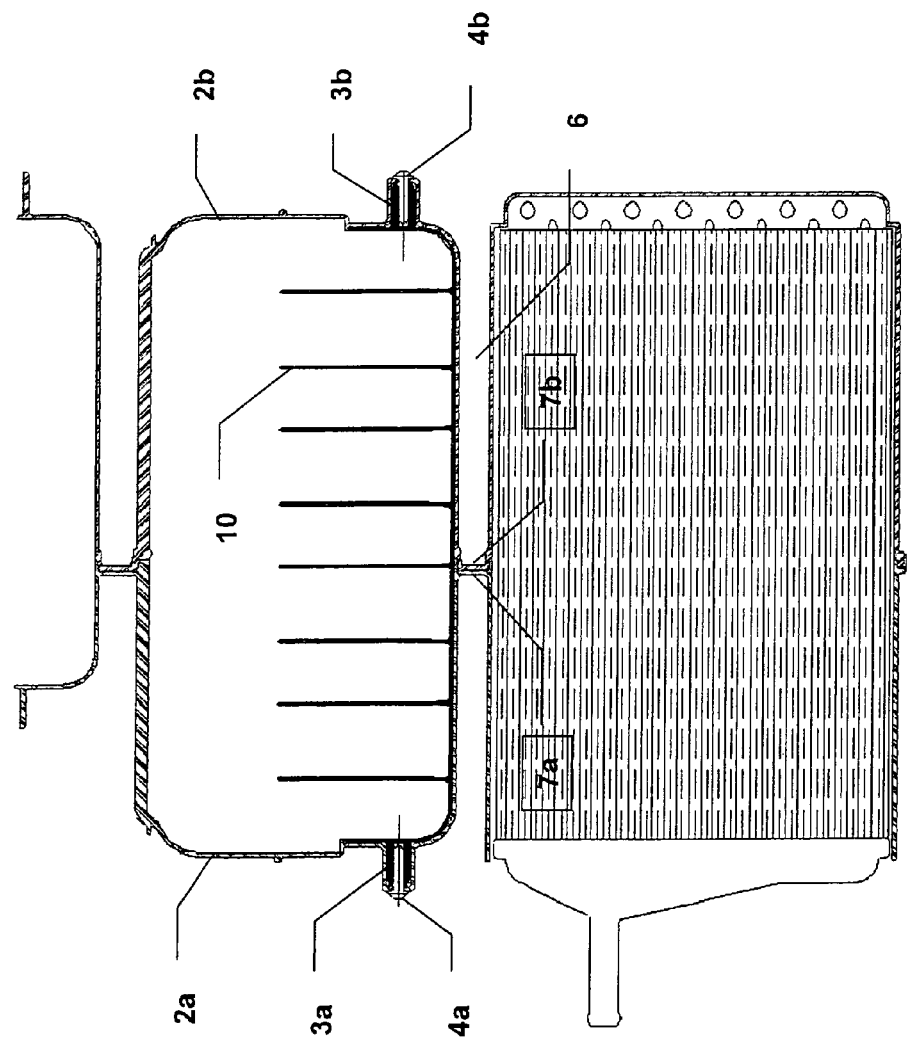
FIG. 3 shows a cross section of an HVAC unit having an alignment feature and fastening means with an optional connecting feature in accordance with an aspect of the present invention

More specifically, as shown in FIGS. 1–3, the present invention relates to an assembly 1 having a means for fastening portions of an at least two portion HVAC housing 2a,2b to provide for an HVAC unit having an alignment feature 10 with fastening points 3a,3b and fastening means 4a,4b so that the alignment feature fastening point 3a,3b is attached or fastened to the housing portions 2a,2b of the HVAC unit 1. In preferred embodiments, the alignment feature is fastened to each housing portion by a fastening means.

Referring to FIGS. 1, 2 and 2a, a cross section is shown of an area of attachment for two housing portions 2a,2b. In FIG. 1, housing portion 2a is directly fastened by a screw 4 to housing portion 2b in area of tower feature 5. Air distribution means are maintained by the inner walls of housing portion 2a and housing portion 2b.

Referring to FIG. 2 and 2a, housing portion 2a is fastened by fastening means 4a to alignment feature 10 with fastening point 3a. Housing portion 2b is fastened by fastening means 4b to alignment feature fastening point 3b. Housing portions 2a,2b are fastened by fastening means 4a,4b to cross flow baffle 10 alignment features fastening points 3a,3b respectively. Air distribution means are maintained by the cross flow baffle walls.

Referring to FIG. 3, an optional connecting feature 6 provides additional support for housing portion 2a and 2b at contact areas 7a and 7b.

The particular configuration of the alignment feature and the housing portions and surrounding structure, may, of course, be modified based on the particular constraints of the HVAC units and the above Figures are non-limiting and illustrative.

The alignment feature fastening point 3a,3b, fastening means 4a,4b and housing portions 2a,2b are made from materials useful for ventilating systems and may include light metal and plastics and state-of-the-art combinations thereof. The attachment or fastening means, may comprise, but is not limited to, brackets, bracing, screw, rivet, glue, or other fastener connection to the alignment feature or HVAC housing portion elements. More preferably, the attachment means may be a screw, rivet or other fastening connection providing a like function.

Preferably, the alignment feature is made of a plastic or plastic like material or of a moldable material similar or identical to that used to form one of the elements of the HVAC unit. More preferably the material is made of the same or similar material as the HVAC unit housing or one of the air baffles or doors or the like that is found within the HVAC unit.

Figure 4:
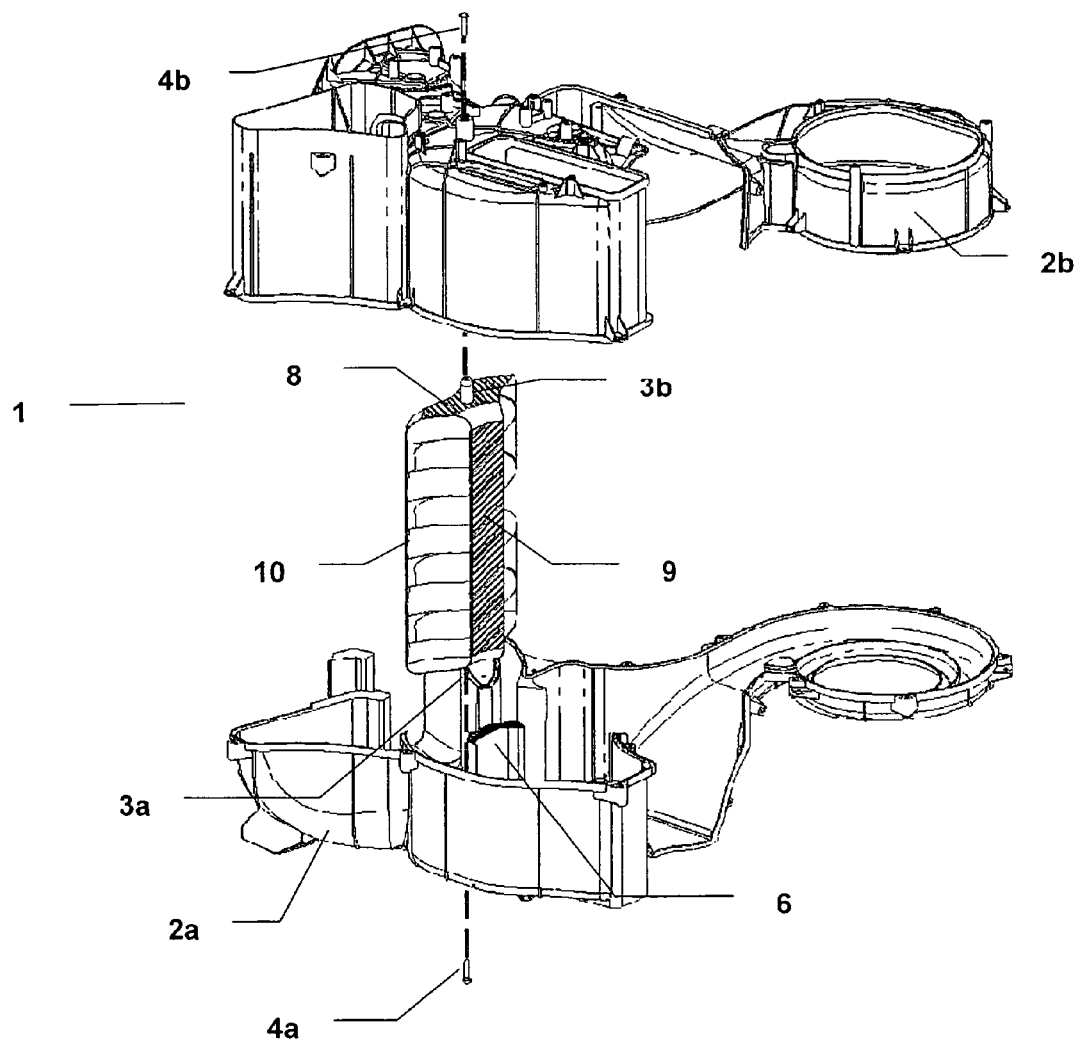
FIG. 4 shows a three dimensional view of an HVAC unit having an alignment feature and fastening means in accordance with an aspect of the present invention.

Referring to FIG. 4, the halves of the housing have reference seal planes 8 and 9 that may be usefully sealed with foam or thermoplastic elastomer seals or by a close fit of the components on either the alignment feature or housing wall, or the connecting feature 6 or on two or more contact areas to effect a sufficiently air tight fit between the housing halves and the subsequent air pathways 11 and 12.

Figure 5:
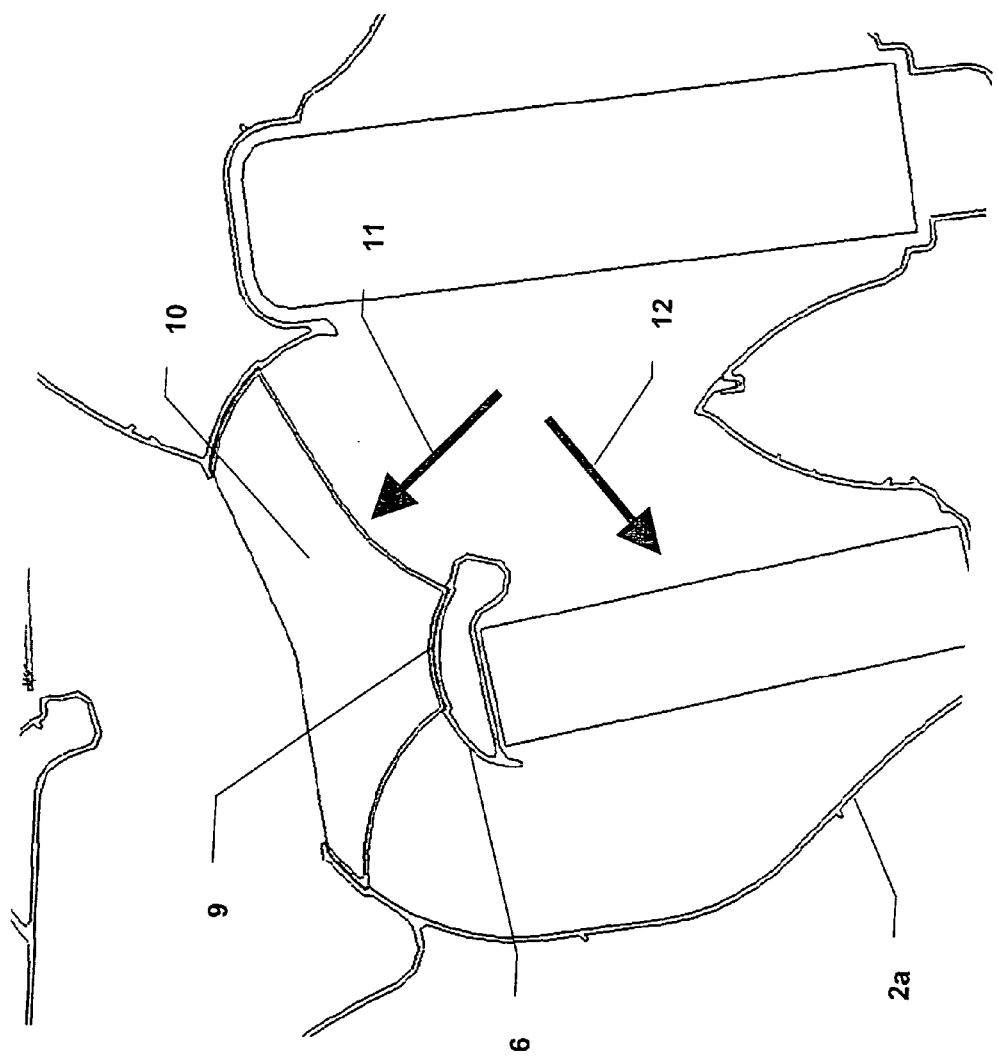
FIG. 5 shows a cross section of an HVAC unit having an alignment feature and fastening means in accordance with an aspect of the present invention.

Referring to FIG. 5, the air flows 11,12 are shown in the HVAC in the area of the heater core and evaporator. The alignment feature 10 is a cross flow baffle.

Referring to FIGS. 4 and 5 the alignment features fastening points 3a,3b may preferably be of any form, provided that it fits with the space constraints required for the assembly as provided by vehicle specifications. The alignment features fastening points 3a,3b are preferably U shaped or form a contour that matches the contour of the HVAC housing portions 2a and 2b in contact with or near the alignment features fastening points 3a,3b that are held together by fastening means 4a and 4b. Most preferably the alignment feature is a baffle 10 that has an air directing function as well as an attachment or fastening function. Most preferably the alignment feature is a cross flow baffle.

In preferred embodiments of the present invention, the alignment feature is fastened to the housing by a fastening means, the fastening means located at the outer wall or perimeter of a housing half containing the alignment feature. More preferred is where the fastening means is a screw, rivet, barcket, bracing snap or clip or other such means.

In preferred embodiment of the present invention, essentially no space is required near the seal surface for a fastening device in direct contact with the alignment feature, the HVAC unit becomes more compact, and more space is available to improve the airflow of the system.

In preferred methods of the present invention, a method for making an HVAC unit assembly is disclosed comprising the steps of: providing an alignment feature; fastening the alignment feature at at least two points to at least two portions of an at least two portion HVAC housing unit via fastening means; and forming thereby an appropriate air sealing around HVAC internal components. In more preferred methods of the present invention, the alignment feature is a cross flow baffle and the fastening means comprises at least one first and one second fastening means. In even more preferred methods, the cross flow baffle is mounted via the at least one fastening means to one HVAC housing portion and by the at least second fastening means to another portion of the HVAC housing unit internal walls.

The present invention is not limited to the aforementioned embodiment, but may be carried out in any of various other forms without departing from the spirit and scope of the invention as defined in the appending claims.

What is claimed is:

1. An HVAC unit housing assembly for automotive applications comprising:
    a first housing portion having at least one fastening point;
    a second housing portion having at least one fastening point;
    an alignment feature having at least two fastening points; and
    a fastening means,
    the alignment feature fastened at at least one fastening point by a fastening means to the at least one fastening point of the first housing portion and fastened to at least one second fastening point by a fastening means to the at least one fastening point of the second housing portion, so that the housing portions form an air sealing around HVAC internal components,
    wherein the fastening means allows movement of the alignment feature around the point of fastening, the alignment feature is made of plastic or plastic like material, and wherein the alignment feature is a cross flow baffle.

2. An HVAC unit housing assembly for automotive applications comprising:
    a first housing portion having at least one fastening point;
    a second housing portion having at least one fastening point;
    an alignment feature having at least two fastening points; and
    a fastening means,
    the alignment feature fastened at at least one fastening point by a fastening means to the at least one fastening point of the first housing portion and fastened to at least one second fastening point by a fastening means to the at least one fastening point of the second housing portion, so that the housing portions form an air sealing around HVAC internal components,
    wherein the fastening means allows movement of the alignment feature around the point of fastening, wherein the alignment feature fastening point is U shaped or forms a contour that matches or closely follows the contour of the HVAC housing portions in contact with or near the alignment feature and wherein the alignment feature is made of a light weight metallic or plastic or plastic like material.

3. An assembly as in claim 2, wherein the alignment feature comprises a baffle.

4. An assembly as in claim 3 wherein the baffle is mounted to the HVAC housing via the fastening means and serves as a bridge between housing portions of the HVAC.

5. An assembly as in claim 3 wherein the baffle is a cross flow baffle.

6. A method for making an HVAC unit assembly comprising the steps of:
    providing an alignment feature;
    fastening the alignment feature at at least two points to at least two portions of an at least two portion HVAC housing unit via fastening means; and
    forming thereby an appropriate air sealing around HVAC internal components,
    wherein the alignment feature is a cross baffle and the fastening means comprises at least one first and one second fastening means.

7. A method as in claim 6, further comprising the steps of mounting the cross flow baffle via the at least one fastening means to one HVAC housing portion and by the at least second fastening means to another portion of the HVAC housing unit internal walls.

* * * * *